Aug. 26, 1958 P. TROMBETTA 2,848,903
SOLENOID ACTUATED OPERATOR SYSTEM
Filed Oct. 28, 1952 2 Sheets-Sheet 1

INVENTOR.
PANFILO TROMBETTA
BY Mason, Kolehmainen
Rathburn & Wyss
ATTORNEYS

Aug. 26, 1958 P. TROMBETTA 2,848,903
SOLENOID ACTUATED OPERATOR SYSTEM
Filed Oct. 28, 1952 2 Sheets-Sheet 2

INVENTOR.
PANFILO TROMBETTA
BY Mason, Kolehmainen, Rathburn & Wyss
ATTORNEYS

# United States Patent Office 2,848,903
Patented Aug. 26, 1958

2,848,903

SOLENOID ACTUATED OPERATOR SYSTEM

Panfilo Trombetta, Milwaukee, Wis.

Application October 28, 1952, Serial No. 317,336

5 Claims. (Cl. 74—516)

This invention relates to a force transmitting and converting apparatus and, more particularly, to a solenoid actuated operator system.

Solenoids are utilized extensively in almost every field of commercial endeavor in many different and varied forms of application although the primary use of solenoids is as a prime mover. Consequently, a solenoid of general application must be able to deliver power in many different planes and directions. This is especially true of solenoids which are utilized as replacements for other solenoids in existing equipment for in these instances it is often impossible to utilize the mountings designed for use with the original solenoid. Also, it is desirable that the solenoids used in either original equipment or as replacements in the original equipment be capable of providing a working stroke which is adjustable both in the force applied and in the distance through which the force is applied. Obviously, it is impossible to design a different solenoid for each application thereof requiring varying forces operating through different distances.

Prior atttempts at providing a solenoid which is capable of delivering an adjustable magnitude of force which operates through an adjustable working stroke are unsatisfactory inasmuch as the adjusting means are often sensitive to pressure and impossible to maintain in the selected adjustment.

Accordingly, one object of this invention is to provide an operator system for a solenoid which is capable of delivering a power stroke in many different planes and directions.

Another object of this invention is to provide such an operator system which is capable of easy manual adjustment in order to convert a force of fixed value operating through a fixed distance in a given plane into a variable force operating through a distance of correspondingly variable value in any other plane.

A further object involves the provision of an operator system of a solenoid which is easily adjusted and which is capable of remaining in such adjusted position when subjected to the effect of repeated shocks or vibration.

Another object is to provide an operator system which is not only easy to adjust, but which is also capable of being economically fabricated and assembled.

In accordance with these and other objects, one embodiment of the invention comprises a solenoid pivotally mounted to a frame member, the force of operation of which is transmitted to a lever arm also pivotally mounted to the frame. This lever arm is provided with a plurality of longitudinally spaced apertures which are adapted to receive a link which interconnects the lever arm with the device to be operated. By engaging the link member within a selected one of the apertures, it is possible to deliver a working stroke to the device to be operated which is adjustable both in working length and in magnitude of force applied.

Another embodiment of the invention includes a pair of solenoids pivotally mounted to a frame member and positioned on opposite sides of a link arm which is secured to an actuating shaft. Energization of either of the solenoids displaces the link arm and consequently the actuating shaft in either of two directions so that a lever arm controlled by the actuating shaft is displaced in either of these two directions. This arm is provided with a plurality of longitudinally spaced apertures which are adapted to receive a link member connected to the device to be operated. By varying the point of interconnection between the pivotally mounted arm and the link, it is possible to obtain a plurality of different forces operating through selected working strokes.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figure 1:
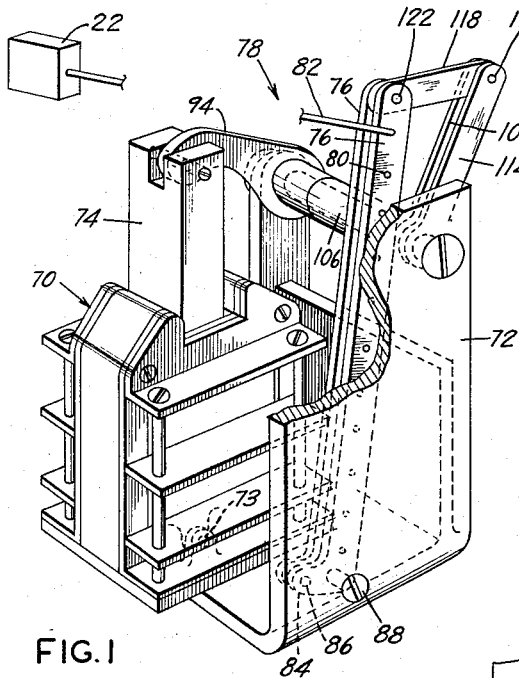
Fig. 1 is a perspective view with portions broken away of a solenoid actuated operator system comprising one embodiment of the invention.
Figure 6:
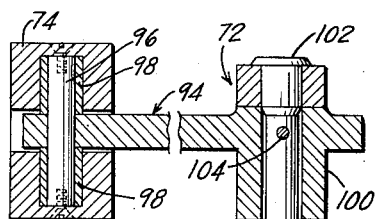
Fig. 6 is an enlarged fragmentary cross-sectional view of a portion of Fig. 1 showing a portion of the operator system.
Figure 4:
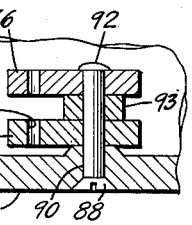
Fig. 4 is a cross-sectional view taken along line 4—4 in Fig. 3, assuming that the complete structure is disclosed in Fig. 3.

Referring now to Figs. 1 to 6, inclusive, of the drawings, there is disclosed a first embodiment of the invention, including a solenoid 70 pivotally mounted to a frame 72 as indicated at 73. Energization of the solenoid 70 moves a bifurcated armature 74 in a downward direction as viewed in Fig. 1 so that a pair of lever arms 76 comprising a portion of an operator system indicated generally as 78 are moved through an arcuate path. The frame 72 may be mounted in a plurality of different positions as more fully described in Trombetta Patent No. 2,694,165, granted November 9, 1954.

In order to provide a means for operating the device 22 with an adjustable magnitude of force working through a variable distance, the arms 76 are provided with a plurality of longitudinally spaced apertures 80. A link member 82 is secured at one end to the device 22 to be operated and the free end of the link member 82 is received within a selected one of the apertures 80. In the embodiment shown in Fig. 1, if the link 82 is connected at the top of the lever arms 76 there will be provided a working stroke and force on the link 82 which is identical to that produced by the downward movement of the armature 74. Displacement of the member 82 in a downward direction to engage different ones of the apertures 80 produces a working stroke which is shorter in length and in which a greater force is applied. Also, extending the length of the arms 76 and then displacing the member 82 in an upward direction to engage different openings 80 which would be provided in such extension, produces a force less than that applied by the downward movement of the armature 74, but which operates through a greater distance. The lever arms 76 are also provided with a projecting portion 84 which extends outwardly from the arms 76 at approximately right angles thereto. An aperture 86 is formed in the projecting portion 84 so as to provide a means for producing substantially vertical motion of the member 82 when received therein as distinguished from the substantially horizontal movement produced by the engagement of the member 82 within the apertures 80.

To provide the pivotal movement of the arms 76 relative to the frame 72, these arms are rotatably mounted on a machine screw 88 (Fig. 4) which extends through a shouldered aperture 90 in the frame 72 and through apertures formed in the two arms 76. One end of the machine screw 88 is swaged over as indicated at 92 to retain the arms on the machine screw 88, and a spacer sleeve 93 is interposed between the two arms 76 to maintain these arms in a spaced relation.

The operator system 78 for transmitting the motion of the solenoid armature 74 to the pair of arms 76 includes a crank arm 94 (Figs. 1, 2 and 6) which is pivotally secured to the armature 74 by a shaft 96. A pair of spacer sleeves 98 which are positioned on the shaft 96 engage the sides of the crank arm 94 to maintain this crank in a centrally located position between the bifurcations of the armature 74. An apertured sleeve portion 100 formed on the crank 94 is positioned on a shaft 102 which is rotatably mounted on the frame 72. The sleeve portion 100 of the crank 94 is rigidly secured to the shaft 102 by means of a pin 104 which extends through both of these members.

A sleeve element 106 having a projecting lug 108 is positioned on the shaft 102 in abutting relation with the sleeve portion 100 and is secured to the shaft 102 by a pin 110. Another sleeve member 112 having a projecting lug 114 formed integral therewith is positioned on the shaft 102 in an abutting position interposed between the wall of the frame 72 and the sleeve 106. The sleeve 112 is rigidly secured to the shaft 102 by a pin 116. Accordingly, when the armature 74 moves in a downward direction upon energization of the solenoid 70, the crank 94 is rotated in a counterclockwise direction as viewed in Fig. 1 of the drawings. This counterclockwise rotation of the crank 94 is imparted to the shaft 102 and subsequently to both of the sleeves 106 and 112 to produce a corresponding counterclockwise movement of the depending lugs 108 and 114.

Figure 5:
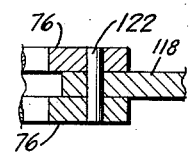
Fig. 5 is a cross-sectional view taken along line 5—5 in Fig. 3, assuming that the complete structure is shown in Fig. 3.
Figure 2:
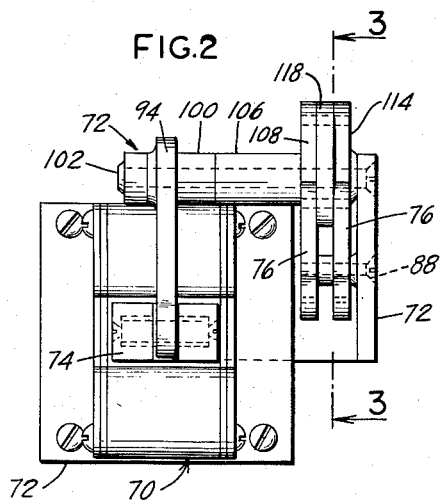
Fig. 2 is a top plan view of the embodiment shown in Fig. 1, assuming that the disclosure of the structure in Fig. 1 is complete.
Figure 3:
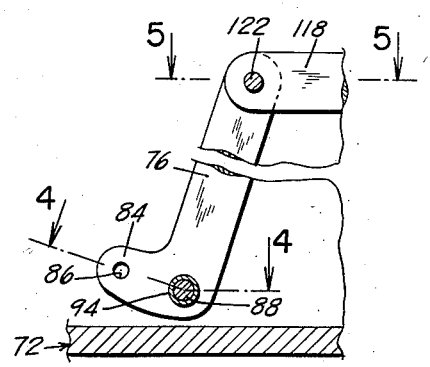
Fig. 3 is a fragmentary sectional view taken along the line 3—3 in Fig. 2.
Figure 7:
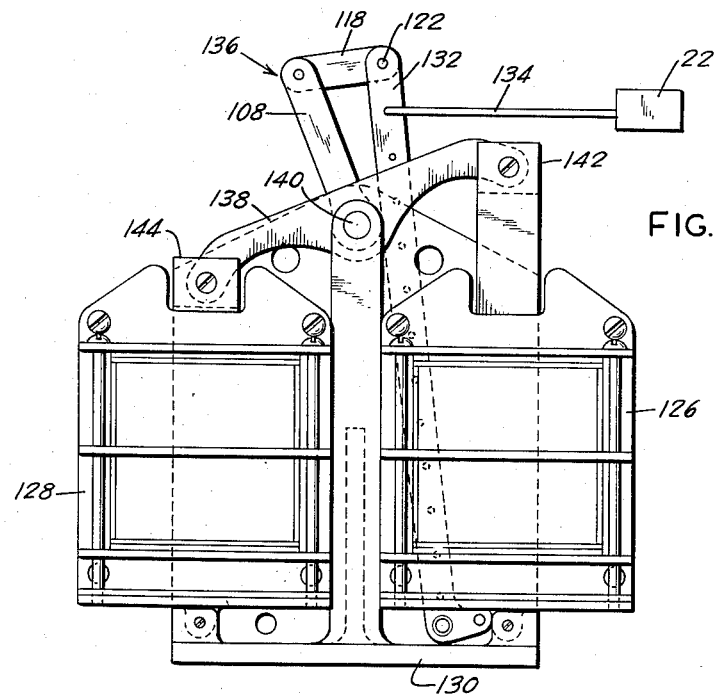
Fig. 7 is a front elevational view of another embodiment of a solenoid actuated operator system embodying the present invention.
Figure 10:
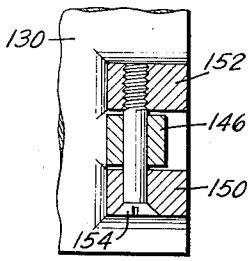
Fig. 10 is a cross-sectional view taken along line 10—10 in Fig. 9, assuming that the entire structure is shown in Fig. 9.
Figure 8:
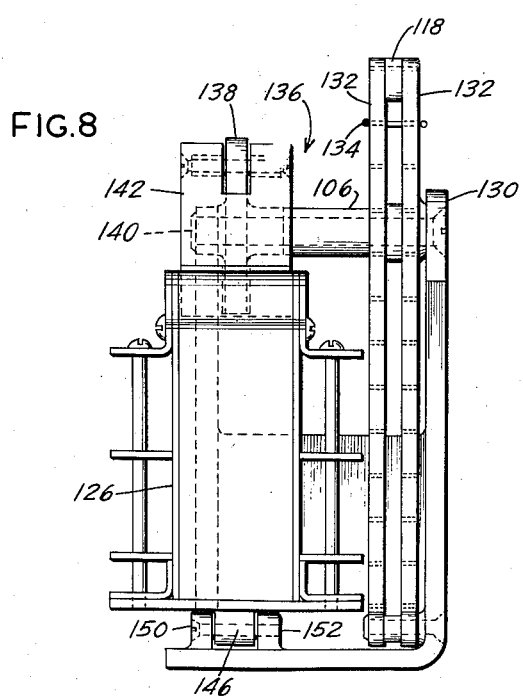
Fig. 8 is a side elevational view of the operator system disclosed in Fig. 7.
Figure 9:
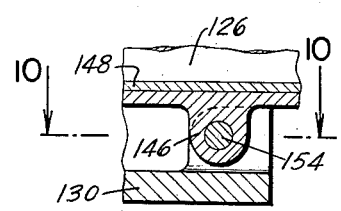
Fig. 9 is an enlarged fragmentary cross-sectional view of the means for pivotally mounting the solenoids shown in Figs. 7 and 8.

The counterclockwise motion of the lugs 108 and 114 is transmitted to arms 76 by a link member 118 which is interposed between the upper extremities of the two lugs and which is pivotally secured thereto at one end by a pin 120. The other end of the link 118 is interposed between the two lever arms 76 and is pivotally secured thereto by a pin 122 (Fig. 5).

In operation, the device 22 is interconnected with the lever arms 76 by engaging the free end of the link member 82 within one of the spaced apertures 80 or 86. Upon energization of the solenoid 70, the armature 74 is moved vertically downward as viewed in Fig. 1 to produce counterclockwise rotation of the crank 94 and consequently of the lugs 108 and 114. This counterclockwise rotation of the lugs is transmitted through the link 118 to rotate or pivot the pair of arms 76 in a counterclockwise direction about the pivot screw 88. This arcuate movement of the pair of arms 76 is transmitted through the link 82 to operate the device 22. Obviously the link 82 could be engaged within any of the apertures 80 or 86 rather than in the aperture 80 disclosed in Fig. 1 of the drawings. Because of the pivotal mounting of the solenoid 70 relative to the frame 72 as indicated at 73, the solenoid 70 pivots slightly relative to the frame 72 during the downward movement of the armature 74 so as to prevent the armature 74 from becoming wedged between opposite faces of the solenoid pole pieces.

The embodiment of the invention disclosed in Figs. 7 to 10, inclusive, of the drawings is similar to that disclosed in Figs. 1 to 6, inclusive, except that a pair of solenoids 126 and 128 are pivotally mounted to a frame 130 to provide means for pivoting a pair of lever arms 132 in opposite directions. The lever arms 132 function to produce an adjustable means in conjunction with a link member 134 to produce the adjustable force and stroke varying means described in conjunction with the lever arms 76 and link member 82 with the exception that the lever arms 132 are rotated in both a clockwise and counterclockwise direction by an operator system indicated generally as 136.

The operator system 136 includes therein a crank arm 138 which is secured to a shaft 140 midway along the length of the crank arm 138. One end of the crank arm 138 is pivotally secured within the bifurcations of a solenoid armature 142 and the opposite end of the crank 138 is pivotally secured within the bifurcated end of a solenoid armature 144. The remainder of the operator system 136 is identical to that described in conjunction with the operator system 78 disclosed in Figs. 1 to 6, inclusive, of the drawings.

The solenoids 126 and 128 are pivotally mounted to the frame 130 by the provision of a lug 146 which projects downwardly from a base plate 148 secured to the bottom of each of the solenoids. The depending portion 146 is apertured and is also positioned between two upstanding portions 150 and 152 formed integral with the frame 130. A machine bolt 154 (Fig. 10) passes through an aperture in the upstanding portion 150, and the aperture in the depending portion 146, and is threadedly engaged within the aperture formed in the upstanding portion 152. This pivotal mounting for the solenoids 126 and 128 is similar to that provided for the solenoid 70 and permits these two solenoids to move in an arcuate direction during the downward movement of either of the armatures 142 or 144.

In operation, the embodiment disclosed in Figs. 7 to 10, inclusive, is similar to that described in conjunction with the embodiment disclosed in Figs. 1 to 6, inclusive, with the exception that either of the solenoids 126 or 128 may be energized. If the solenoid 126 is energized, the armature 142 is moved vertically downward to rotate both the shaft 140 and the lever arms 132 in a clockwise direction to produce a movement to the right, as viewed in Fig. 7, of the link member 134, whereby the device 22 is operated. However, if the solenoid 128 (shown in an operated position in Fig. 7) is operated, the armature 144 moves vertically downward to rotate the shaft 140, and consequently the lever arms 132, in a counterclockwise direction.

Obviously, the operator system 78 shown in Figs. 1 to 6, inclusive, as being actuated by a single solenoid 70 may be actuated by a pair of solenoids connected to the system 78 in tandem. This tandem connection may be accomplished by connecting the opposite ends of the armatures associated with a pair of aligned solenoids to the crank arm 94 so that, upon energization of these solenoids, the cumulative operating forces thereof are applied to the operator system 78.

While there have been illustrated and described several embodiments of the present invention, it should be understood that the present invention is not limited to the specific details of construction and arrangement thereof herein illustrated, and that changes and modifications will occur to those skilled in the art without departing from the present invention. It is intended in the appended claims to cover all such changes and modifications as fall within the true spirit and scope of the present invention.

What is claimed as new and desired to be secured by Letters Patent of the United States is:

1. An apparatus for operating a device comprising a frame, a solenoid pivotally mounted on the frame, a shaft movably mounted on the frame, means secured to the shaft and controlled by the solenoid for moving the shaft, an arm pivotally mounted on the frame, means interconnecting the arm with the shaft to produce movement of the arm in response to movement of the shaft, said arm having a plurality of spaced apertures therein, and means secured to the device and engageable within a selected one of the apertures to operate the device in accordance with a movement of the arm.

2. An apparatus for operating a device comprising a frame, a shaft rotatably mounted on the frame, a crank arm secured to the shaft, means for moving the crank arm through a predetermined distance with a predetermined force, a first pair of arms secured to the shaft, a first link element having one end thereof interposed between and pivotally secured to the first pair of arms, a second pair of arms movably mounted on the frame and pivotally secured to the link at the free end thereof, and a second link member operatively engaged at one end by the device to be operated, said second pair of arms having means for securing the second link member thereto at a plurality of different positions whereby an adjustable magnitude of said predetermined force moving through an adjustable length is applied to said device to be operated.

3. An apparatus for operating a device comprising a frame, a shaft rotatably mounted on the frame, a crank arm secured to said shaft, means for moving the crank arm through a predetermined distance with a predetermined force, a first arm secured to said shaft, a first link element having one end thereof pivotally secured to said first arm, a second arm movably mounted on the frame and pivotally secured to said first link at the free end thereof, and a second link member operatively engaged at one end by the device to be operated, said second arm having means for securing said second link member thereto at a plurality of different positions whereby an adjustable magnitude of said predetermined force moving through an adjustable length is applied to said device to be operated.

4. The apparatus set forth in claim 3 in which said crank arm is secured to said shaft intermediate the ends of said crank arm and in which said means for moving said crank arm includes first motor means connected to one of said ends of said arm and second motor means connected to the other of the ends of said arm.

5. The apparatus set forth in claim 3 in which said means for moving said crank arm includes a solenoid having an armature pivotally connected to said crank arm at a point spaced from said shaft.

References Cited in the file of this patent

UNITED STATES PATENTS

| | | |
|---|---|---|
| 1,781,246 | Reynolds | Nov. 11, 1930 |
| 1,852,286 | Bragg | Apr. 5, 1932 |
| 2,052,764 | Harrison | Sept. 1, 1936 |
| 2,156,127 | Roberts | Apr. 25, 1939 |
| 2,165,460 | Desing | July 11, 1939 |
| 2,361,810 | Bazley | Oct. 31, 1944 |